June 16, 1942.   C. E. NORTON   2,286,566
PIPE CONNECTION
Filed Jan. 31, 1941   3 Sheets-Sheet 1
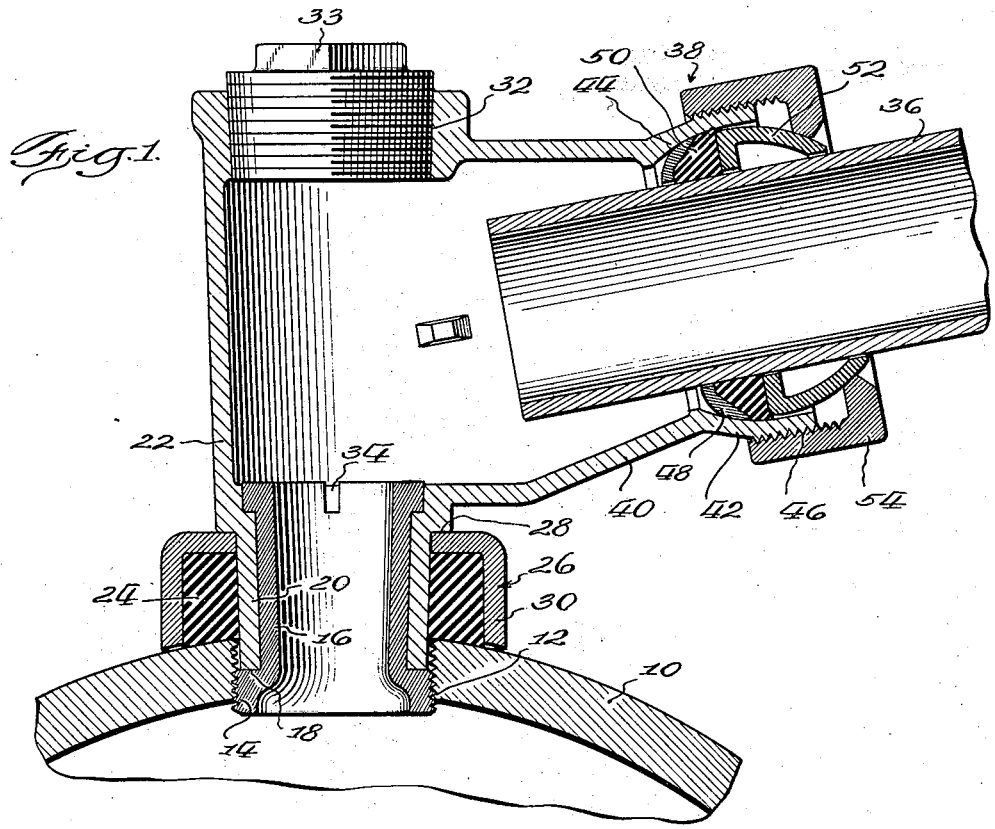
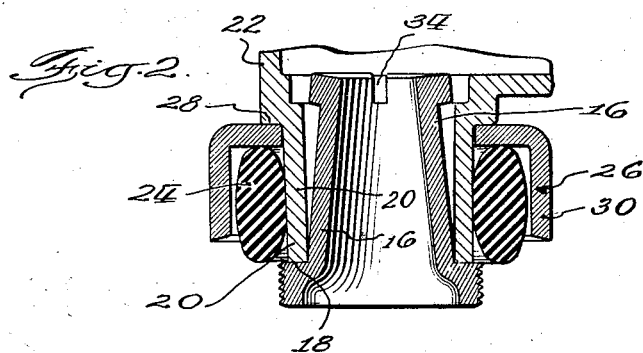
Inventor
Charles E. Norton June 16, 1942.  C. E. NORTON  2,286,566
PIPE CONNECTION
Filed Jan. 31, 1941  3 Sheets-Sheet 2
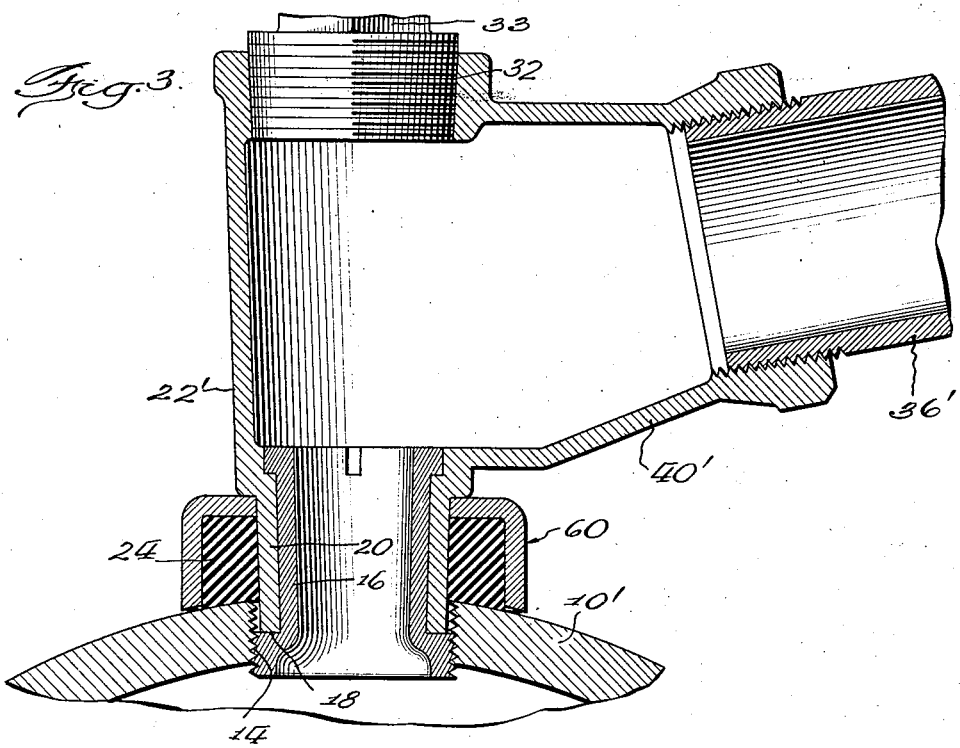
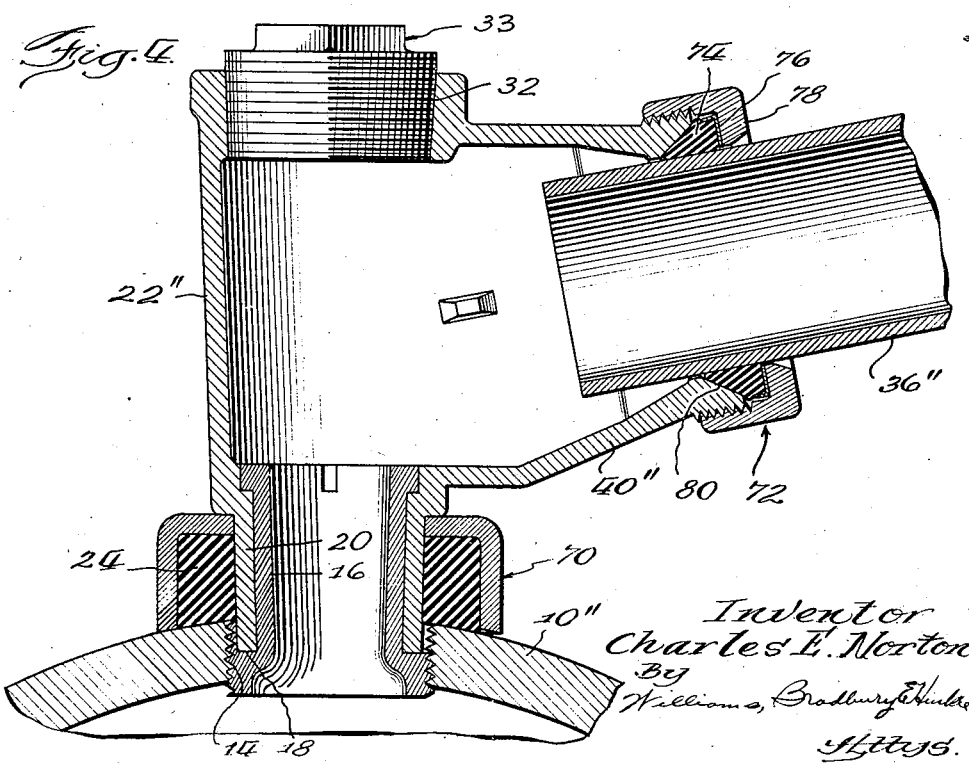
Inventor
Charles E. Norton
By
Williams, Bradbury & Hinkle
Attys.

June 16, 1942. C. E. NORTON 2,286,566
PIPE CONNECTION
Filed Jan. 31, 1941 3 Sheets-Sheet 3
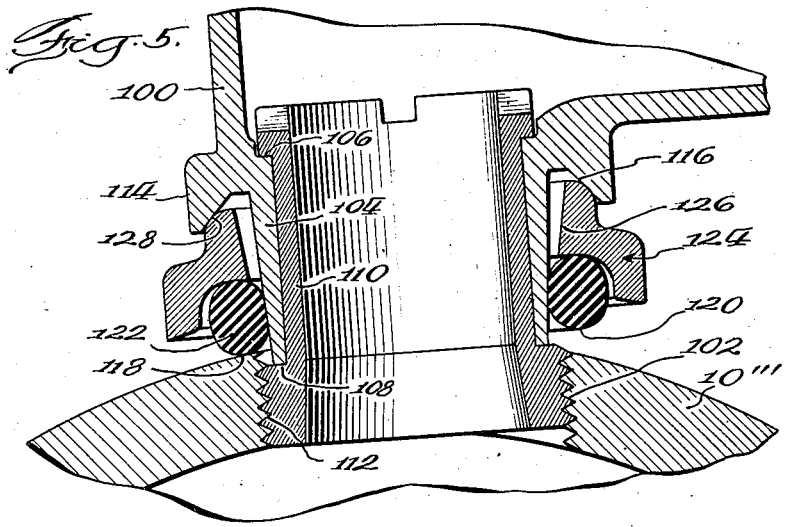
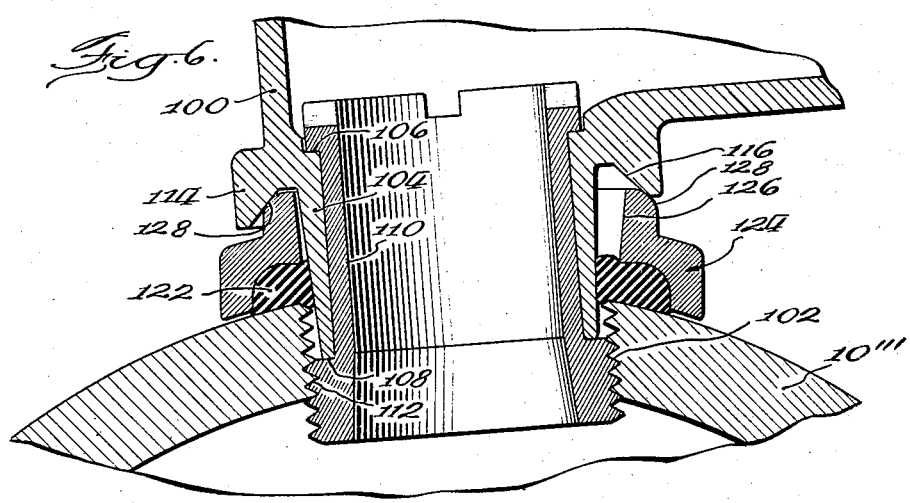
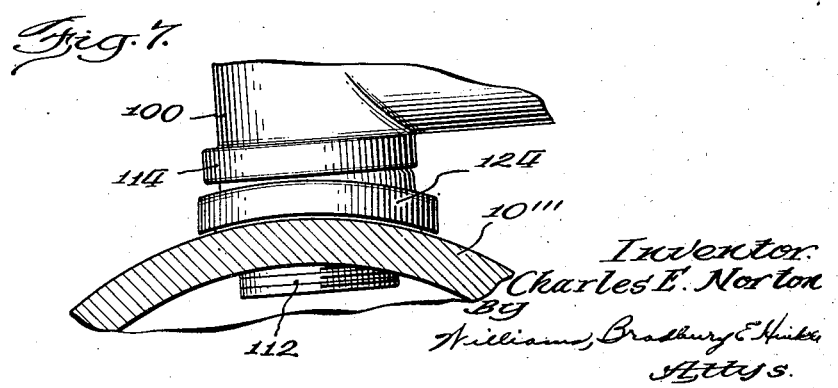
Inventor.
Charles E. Norton
By
Williams, Bradbury & Hinkle
Attys.

Patented June 16, 1942

2,286,566

UNITED STATES PATENT OFFICE 2,286,566

PIPE CONNECTION

Charles E. Norton, Evanston, Ill., assignor to Norton-McMurray Manufacturing Company, Chicago, Ill., a corporation of Illinois Application January 31, 1941, Serial No. 376,771

10 Claims. (Cl. 285—2)

My invention relates to pipe connections and is concerned with pipe connections adapted for use in all kinds of pipe installations, although more particularly concerned with the connections used in connecting a gas main to a house service pipe.

An object of my invention is to provide a novel connection between the gas main and the house service pipe which will eliminate complicated and expensive swivel connections now commonly used for this purpose.

Another object of my invention is to provide a simple and inexpensive means for connecting a gas main to a house service pipe and which will accommodate various angular relations in various planes between the gas main and house service pipe.

Another object of my invention is to provide an improved T fitting for connecting piping of various kinds.

Another object of my invention is to provide an improved means for swiveling a T connection to a pipe.

Another object of my invention is to provide an improved swivel for pipe connections.

Another object of my invention is to provide a swivel connection which will adjust itself to effect a perfect seal even where the hole drilled in the side of a pipe is not drilled on a radius of the pipe.

Other objects and advantages will become apparent as the description proceeds.

In the drawings:

Fig. 1 is a sectional view of a pipe connection embodying a preferred form of my invention and showing the swivel connection in final assembled position;

Fig. 2 is a sectional view showing the swivel connection of Fig. 1 in a preliminary stage;

Fig. 3 is a view similar to Fig. 1 but showing a modified form of my invention;

Fig. 4 is a view similar to Fig. 1 but showing a further modification of my invention;

Fig. 5 shows in a partially assembled condition a swivel connection particularly designed to compensate for misalignment of the hole drilled in the side of a gas main or other pipe;

Fig. 6 is a view of the swivel connection of Fig. 5 in fully tightened position; and Fig. 7 is a side view of the swivel connection of Figs. 5 and 6.

In Figs. 1 and 2 of the drawings, I have indicated a gas main 10 of the type commonly running along the street in front of a row of houses and adapted to be connected with these houses to supply the gas appliances thereof. The main 10 is illustrated as having a threaded opening 12 in the upper surface thereof and into this opening is screwed the threaded lower end 14 of a sleeve 16. The lower end of the sleeve 16 is provided with an external shoulder 18 adapted to receive and support the tubular lower end 20 of a T 22.

A compressible gasket 24 of rubber or other suitable material surrounds the end 20 of the T 22 and rests against the upper surface of the pipe 10. The gasket 24 is surrounded by a housing 26 confined between the upper surface of the main 10 and a shoulder 28 provided by the T 22. The cylindrical portion 30 of the housing 26 is shorter than the height of the gasket 24 so that the housing 26 will not interfere with compression of the gasket.

The function of the sleeve 16 is to hold the T 22 in swiveling engagement with the pipe 10 and to maintain the gasket 24 in sealing engagement with the main 10 and end 20 of the T 22. In Fig. 1 this sleeve is shown in normal condition, whereas in Fig. 2 I have illustrated the shape of the sleeve 16 in a preliminary stage in the assembly of the complete T 22.

In manufacturing the complete T 22 with its swiveled and universal connections, the sleeve 16 initially has the tapered shape shown in Fig. 2. In assembling the swiveled connection to the lower end of the T 22, the housing 26 is first slipped over the tubular end 20 of this T until it abuts the shoulder 28. Thereafter the gasket 24 is stretched slightly and slipped over the tubular end 20 until it assumes the position shown in Fig. 2. The gasket 24 is preferably made with an internal diameter slightly smaller than the external diameter of the tubular part 20 so that the gasket will firmly grip this part 20 and not be dislodged therefrom in subsequent handling of the complete T.

After the housing 26 and gasket 24 have been thus assembled on the tubular part 20 of the T 22, the tapered sleeve 16 is inserted into the tubular part 20, as indicated in Fig. 2. Thereafter the upper end of the sleeve 16 is expanded to the position shown in Fig. 1 by driving a conical tool into the upper end of the sleeve 16. This tool may be inserted through the opening 32 in the upper part of the T 22.

The T as supplied to the workmen who are to install it is thus provided with the swivel connection at the lower end thereof, and with a universal joint, which I shall presently describe, at the end of the lateral extension of the T. The workmen drill and tap the opening 12 into the upper side of the main 10 and screw the thread part 14 of the sleeve 16 into this opening. This is accomplished by inserting a screw driver or other suitable tool through the opening 32 of the T so that it engages the slots 34 in the upper end of the sleeve 16. As the sleeve 16 is screwed into the threaded opening 12, the gasket 24 is distorted to the shape shown in Fig. 1 and seals against the upper part of the main 10 around the opening 12 and the external surface of the tubular part 20 of the T.

In Fig. 1 I have shown the T 22 connected to a house service pipe 36 by means of a universal joint indicated generally by reference numeral 38. The lateral extension 40 of T 22 terminates in a flaring mouth 42 having an internal spherical surface 44 and being provided with external threads 46. An annular metal washer 48 engages the spherical surface 44 and forms an inward stop for a flexible gasket 50 of rubber or other suitable material. The follower ring 52 forces the gasket 50 against washer 48 under the influence of a tubular nut 54 secured to the threads 46. The compression of the gasket 50 between gasket 48 and follower 52 distorts this gasket into sealing engagement with the exterior surface of the service pipe 36 and with the surface 44 of the T 22 and prevents the escape of fluids therebetween for all positions of the service pipe 26 relative to the T 22.

The particular piping connections shown in Figs. 1 and 2 represent an important advance in the manner of connecting a service pipe with a main, since it eliminates several complicated additional connections heretofore necessary where the service pipe was not at the proper predetermined vertical and horizontal angles relative to the main 10. With my improved T 22 no additional parts are necessary to provide for a wide variety of horizontal and vertical angular relationships between the main 10 and the service pipe 36. The universal connection between the T 22 and service pipe 36 accommodates a wide range of angular relationships in both horizontal and vertical planes between the service pipe 36 and the lateral extension 40 of the T 22. This range of angular relationships is greatly increased by the swivel connection between the T 22 and the main 10. My new and improved pipe connections also have another important advantage over prior art structures. In prior art practice, it was customary to thread the lower end of the T and screw it into the main. The point at which the threaded lower end of the T extended above the main was a particularly weak point for corrosion and most prior art piping installations failed at this point due to corrosion of the threaded portion of the T immediately above the upper surface of the main.

With my improved swivel connection between the T 22 and main 10, it is unnecessary to thread the lower end of the T so that this end may be the full thickness of the metal and also have the benefit of the corrosion resisting effect of the natural scale formed in the process of making the T 22. This natural scale is of material aid in resisting corrosive action on the metal, and the absence of threads also leaves no thin portions of the wall which could be eaten through much more quickly than the full thickness of the wall.

After the T 22 has been secured to the pipe 10 and to the service pipe 36, the opening 32 in the upper end of the T is normally closed by a conventional plug 33 in accordance with the usual practice.

While I have found that the pipe connections shown in Figs. 1 and 2 are particularly desirable in that they make it possible to eliminate many swivel joints and short sections of pipe between such joints, there are certain installations in which a universal joint between the T and the house service pipe is unnecessary. In Figs. 3 and 4 I have shown a T having my novel swivel connection to a main but not provided with a universal joint between the lateral extension of the T and the service pipe.

In Fig. 3 I have illustrated a T 22' connected to a main 10' by means of a swivel connection indicated generally by reference numeral 60 and identical in all respects with the swivel connection illustrated in Figs. 1 and 2. The lateral extension 40' of the T 22' has a conventional threaded end screwed to the threaded end of a service pipe 36'.

The pipe connections of Fig. 3 provide for all horizontal angular relationships between the main 10' and the service pipe 36' and are entirely satisfactory where the service pipe 36' has the proper vertical angularity with respect to the main 10'.

In Fig. 4 I have illustrated a further modification wherein the T 22" is connected to the main 10" by a swivel connection 70 which is identical with that shown in Figs. 1 and 2. In this embodiment, the lateral extension 40" of the T 22" is connected to service pipe 36" by a compression coupling indicated generally by reference numeral 72. This compression coupling comprises a flexible gasket 74 of rubber or other suitable material, a metal retainer ring 76 and a nut 78 threadedly engaging the extension 40" and urging the gasket 74 into sealing engagement with the external surface of pipe 36" and with the flared surface 80 provided by the extension 40". The compression coupling 72 may be of the type disclosed and claimed in my co-pending application Serial No. 236,136, filed October 21, 1938, although other types of compression couplings may be used.

The embodiment of Fig. 4 has the same advantages as the embodiment of Fig. 3 plus the further advantage that the service pipe 36" may be inserted a greater or lesser distance into the lateral extension of the T. The installation of Fig. 4, like that of Fig. 1, has the further advantage that the service pipe need not be provided with external threads. This latter advantage eliminates the operation of threading the service pipe and also avoids the weakened resistance to corrosive action which results from threading, although the service pipe is not as vulnerable to corrosion as is the lower end of the conventional T at the point immediately above its connection with the main.

The novel universal joint shown in Fig. 1 is claimed in my co-pending application Serial No. 364,987, filed Nov. 9, 1940, and is the kind of universal joint which I prefer to use, although other universal joints may be used if desired.

Figs. 5, 6 and 7 illustrate a modified form of swivel connection particularly designed to provide a perfect seal between the T 100 and the main 10''', even where the threaded opening 102 is drilled at an appreciable angle to a radius of the main. It should be understood that the openings 102 are ordinarily drilled while the main is in the ground and it is difficult to drill the openings 102 as accurately as they should be drilled in order to provide a perfect seal for a swivel connection like that shown in Figs. 1 to 4 inclusive. I have accordingly designed a special swivel connection adapted for use where the misalignment between the threaded opening in the main and a radius of that main is greater than can be accommodated by the swivel connection of Figs. 1 to 4.

The T 100 has a tubular lower end 104 confined between shoulders 106 and 108 of a sleeve 110, having a threaded lower end 112 adapted to engage the threads of the opening 102 in the main and to secure the T 100 in swiveled relation thereto. The lower end of the T 100 is also provided with a ringlike portion 114, providing an internal surface 116 which may be either conical or spherical, as preferred.

Figs. 5 and 6 clearly show that where the opening 102 is drilled at an appreciable angle to a radius of the main, the outer surface of the main at point 118 is considerably higher than the opposite surface 120, measured axially of the opening 102. The surface 118 thus engages the gasket 122 before the opposite surface 120 engages this gasket.

Above the gasket 122 is a housing 124 having an inner tapered surface 126 which loosely fits the tubular extension 104 of the T 100. The housing 124 is provided with a spherical surface 128 adapted to engage and form a universal joint with the conical or spherical surface 116. As the sleeve 110 is screwed into the opening 102 to compress and distort the gasket 122, the housing 124 is cocked to the position shown in Fig. 6, whereby equal pressure is exerted on both sides and in fact upon all parts of the gasket 122 to effect a perfect seal between this gasket and the main 10''' and the tubular portion 104 of the T 100.

Fig. 7 is a side view of the swivel connection of Figs. 5 and 6 and shows the manner in which the housing 124 is conformed to the external surface of the main. It will be understood that the housings 26 of the previous embodiments are preferably given the same shape as the housing 124 so that all of these housings have their lower edges in close proximity to the external surface of the main and provide only small crevices therebetween.

In Figs. 5 and 6 I have indicated the opening 102 as being offset laterally with respect to a diameter of the main. It frequently occurs that this opening is at a longitudinal angle with respect to a true radius of the main and the swivel connection illustrated in Figs. 5, 6 and 7 is designed to accommodate all types of angular misalignment between the axis of the opening 102 and a radius of the main 10'''. It will be further understood that the T 100 may have any of the means shown in Figs. 1, 3 and 4 for connecting it with a house service pipe.

While I have illustrated and described only a few embodiments of my invention, it is to be understood that my invention is not limited to the details shown, but includes other embodiments coming within the scope of the appended claims.

I claim:

1. Means for connecting a gas main with a house service pipe in various vertical and horizontal angular relationships comprising a T having a tubular end with a smooth outer surface adapted to be slidably received in a threaded opening in the side of said main, a sleeve having a threaded end adapted to be screwed into said opening and an external shoulder adjacent said end to receive the end of said T, said sleeve having a second external shoulder adapted to overlie a complementary shoulder on said T to lock said T to said main in swiveling relation thereto, a compressible gasket abutting the tubular end of the T and the exterior surface of the main around said opening, a housing for said gasket urged toward said main by said T, said housing permitting compression of said gasket under the thrust of said T whereby a sealed joint is established between said T and said main, a lateral extension provided by said T, and universal joint means carried by said extension and adapted to form a sealed universal connection between said T and a house service pipe, said T having walls inwardly of said universal joint and adapted to be engaged by the end of said house service pipe to limit movement therebetween.

2. A T having a tubular end with a smooth outer surface adapted to be slidably received in a threaded opening in the side of a pipe, a sleeve having a threaded end adapted to be screwed into said opening and an external shoulder adjacent said end to receive the end of said T, said sleeve having a second external shoulder adapted to overlie a complementary shoulder on said T to lock said T to said pipe in swiveling relation thereto, a compressible gasket abutting the tubular end of the T and the exterior surface of the pipe around said opening, a housing for said gasket urged toward said pipe by said T, said housing permitting compression of said gasket under the thrust of said T whereby a sealed joint is established between said T and said pipe, a lateral extension provided by said T, and universal joint means carried by said extension and adapted to form a sealed universal connection between said T and a second pipe, said T having walls inwardly of said universal joint and adapted to be engaged by the end of said second pipe to limit movement therebetween.

3. Means for connecting a gas main with a house service pipe in various angular relationships comprising a T having a tubular end with a smooth outer surface adapted to be slidably received in a threaded opening in the side of said main, a sleeve having a threaded end adapted to be screwed into said opening and an external shoulder adajacent said end to receive the end of said T, said sleeve having a second external shoulder adapted to overlie a complementary shoulder on said T to lock said T to said main in swiveling relation thereto, a compressible gasket abutting the tubular end of the T and the exterior surface of the main around said opening, a housing for said gasket urged toward said main by said T, said housing permitting compression of said gasket under the thrust of said T whereby a sealed joint is established between said T and said main, a lateral extension provided by said T, and means carried by said extension and adapted to form a sealed connection between said T and a house service pipe.

4. A fitting having a tubular end with a smooth outer surface adapted to be slidably received in a threaded opening of a complementary member, a sleeve having a threaded end adapted to be screwed into said opening and an external shoulder adjacent said end to receive the end of said fitting, said sleeve having a second external shoulder adapted to overlie a complementary shoulder on said fitting to lock said fitting in swiveling relation to said member, a compressible gasket surrounding the tubular end of the fitting and engaging the surface of the member around said opening, and a metal annulus for urging said gasket into sealing engagement with said tubular end and said member whereby a sealed joint is established between said fitting and said member.

5. A swivel joint comprising a first member providing a threaded opening, a sleeve having an end screwed into said opening, a second member having a tubular end surrounding said sleeve and slidably received in said opening, said sleeve having a second end overlying a portion of said second member to lock said two members in swiveled relationship, a compressible gasket engaging said two members, and means actuated by screwing said sleeve into said opening to compress said gasket against said members and seal the joint therebetween.

6. A swivel joint comprising a first member providing a threaded opening, a sleeve having an end screwed into said opening, a second member having a tubular end surrounding said sleeve and slidably received in said opening, said sleeve having a second end overlying a portion of said second member to lock said two members in swiveled relationship, a compressible gasket engaging said two members, and means having a universal connection with said second member and actuated by screwing said sleeve into said opening to compress said gasket against said members and seal the joint therebetween for varying angular relationships between said members.

7. A swivel joint comprising a cylindrical member having a lateral opening therein at an angle to a radius of the said cylindrical member, a second member, means for securing said members in swiveled relationship, a gasket for sealing the joint between said members, and a housing having a universal connection with one of said members for holding said gasket in sealing engagement with said members.

8. A swivel connection comprising a first member having a tubular end and an annular surface adjacent said end, a second member, means for holding said members in swiveled relationship, a gasket for forming a sealed connection between said members, and means forming a universal joint with said surface for pressing said gasket against said members.

9. A swivel joint comprising a first member providing a threaded opening, a sleeve having an end screwed into said opening, a second member having a tubular end surrounding said sleeve and movable relative to said first member, said sleeve having a second end overlying a portion of said second member to lock said two members in swiveled relationship, a compressible gasket engaging said two members, and means actuated by screwing said sleeve into said opening to compress said gasket against said members and seal the joint therebetween.

10. Means for connecting a gas main with a house service pipe in various angular relationships comprising a T having a tubular end adapted to be connected to said gas main, a sleeve having a threaded end adapted to be screwed into a threaded opening in the side of said main, said sleeve having a part located within said tubular end and in swiveling relationship thereto, said sleeve having an external shoulder adapted to overlie a complementary shoulder on said T to lock said T to said main in swiveling relation thereto, a compressible gasket abutting the tubular end of the T and the exterior surface of the main around said opening, a housing for said gasket urged toward said main by said T, said housing permitting compression of said gasket under the thrust of said T whereby a sealed joint is established between said T and said main, a lateral extension provided by said T, and means carried by said extension and adapted to form a sealed connection between said T and a house service pipe.

CHARLES E. NORTON.